(12) United States Patent
Lin et al.

(10) Patent No.: US 7,782,767 B1
(45) Date of Patent: Aug. 24, 2010

(54) METHOD AND SYSTEM FOR CALCULATING BURST BIT RATE FOR IP INTERACTIVE APPLICATIONS

(75) Inventors: Lisan Lin, Plano, TX (US); Michael Reiman, Plano, TX (US); Mark Chen, Carrollton, TX (US); Charles Moore, Plano, TX (US)

(73) Assignee: Tektronix, Inc., Beaverton, OR (US)

( * ) Notice: Subject to any disclaimer, the term of this patent is extended or adjusted under 35 U.S.C. 154(b) by 1164 days.

(21) Appl. No.: 11/185,098

(22) Filed: Jul. 20, 2005

(51) Int. Cl.
G01R 31/08 (2006.01)
H04L 1/00 (2006.01)
(52) U.S. Cl. ............................ 370/229; 370/252
(58) Field of Classification Search ............ 370/229, 370/252
See application file for complete search history.

(56) References Cited

U.S. PATENT DOCUMENTS

| | | | | |
|---|---|---|---|---|
| 4,792,800 A | * | 12/1988 | Fujioka et al. | 370/360 |
| 5,276,676 A | * | 1/1994 | Horn et al. | 370/234 |
| 5,699,346 A | | 12/1997 | VanDervort | |
| 6,625,648 B1 | * | 9/2003 | Schwaller et al. | 709/224 |
| 7,023,825 B1 | * | 4/2006 | Haumont et al. | 370/338 |
| 7,197,762 B2 | * | 3/2007 | Tarquini | 726/3 |
| 7,352,700 B2 | * | 4/2008 | Chan et al. | 370/235 |
| 2002/0080726 A1 | * | 6/2002 | Klassen et al. | 370/252 |
| 2002/0167942 A1 | * | 11/2002 | Fulton | 370/352 |
| 2003/0233445 A1 | * | 12/2003 | Levy et al. | 709/224 |
| 2004/0240465 A1 | * | 12/2004 | Newberg et al. | 370/442 |
| 2004/0260831 A1 | * | 12/2004 | Dyck et al. | 709/233 |
| 2005/0018611 A1 | * | 1/2005 | Chan et al. | 370/241 |
| 2005/0111428 A1 | * | 5/2005 | Orlik et al. | 370/344 |
| 2005/0212687 A1 | * | 9/2005 | Nishikata | 340/825.72 |
| 2008/0151881 A1 | * | 6/2008 | Liu et al. | 370/389 |

FOREIGN PATENT DOCUMENTS

EP 1 511 230 3/2005

* cited by examiner

*Primary Examiner*—Derrick W Ferris
*Assistant Examiner*—Angel Brockman
(74) *Attorney, Agent, or Firm*—Fulbright & Jaworski L.L.P.

(57) ABSTRACT

A method and apparatus for determining the burst bit rate for data in the transport layer of a network is described. The burst bit rate is determined by measuring the time for a total number of bytes to be transferred across a point in the network and adding that time to an estimated network delay. The total number of bytes transferred is then divided by the transfer time plus the estimated network delay thereby calculating the burst bit rate for the transfer.

33 Claims, 11 Drawing Sheets

METHOD AND SYSTEM FOR CALCULATING BURST BIT RATE FOR IP INTERACTIVE APPLICATIONS

TECHNICAL FIELD

The present invention is directed to a system and method for calculating bit burst rates in packet-based data networks.

BACKGROUND

A service-level agreement is a contract that defines the technical support or business parameters that a service provider firm will provide its clients. The agreement typically spells out measures for performance and consequences for failure. In connection with packet-based data networks, a service-level agreement may define connectivity and availability parameters, such as minimum data rates and burst bit rates. Such service-level agreement parameters are difficult to measure or in some cases cannot be measured using existing technology. The present invention provides a system and method for calculating bit burst rates in packet-based data networks.

BRIEF SUMMARY OF THE INVENTION

A method for calculating a burst bit rate in a network is described which includes determining a total delay time by determining a time for a number of bytes to pass a point in the network and adding an estimated network delay time. The total number of bytes are then divided by the total delay to calculate the burst bit rate. The estimated network delay time is determined by estimating a round trip sender delay and a round trip receiver delay, summing those delays and dividing by two. The burst bit rate calculated can be the burst bit rate for an out-of-band transfer, or either an imbedded or non-imbedded in-band transfer.

In another embodiment, a method for calculating a burst bit rate in the transport layer of a network is described, the method including monitoring a start time for a first packet transferred from a sender, and monitoring an end time for a last packet transferred from the sender. The method also includes determining a total number of bytes transferred from the sender to a receiver, and estimating a network delay. The burst bit rate is then calculated by dividing the total number of bytes transferred by the difference between the end time and the start time plus the estimated network delay.

A system for determining a burst bit rate is also described. The system includes a computing platform connected to a network and operable to determine a number of bytes transferred from a sender to a receiver, determine a time between a first packet sent by the sender and a last packet sent by the sender, and determine an estimated network delay. The computing platform is then operable to divide the number of bytes by the time plus an estimated network delay to calculate the burst bit rate. The computing platform may be part of General Packet Radio Service Gateway Support Node, a network monitor, or any other piece of equipment in, or connected to, the network.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1:
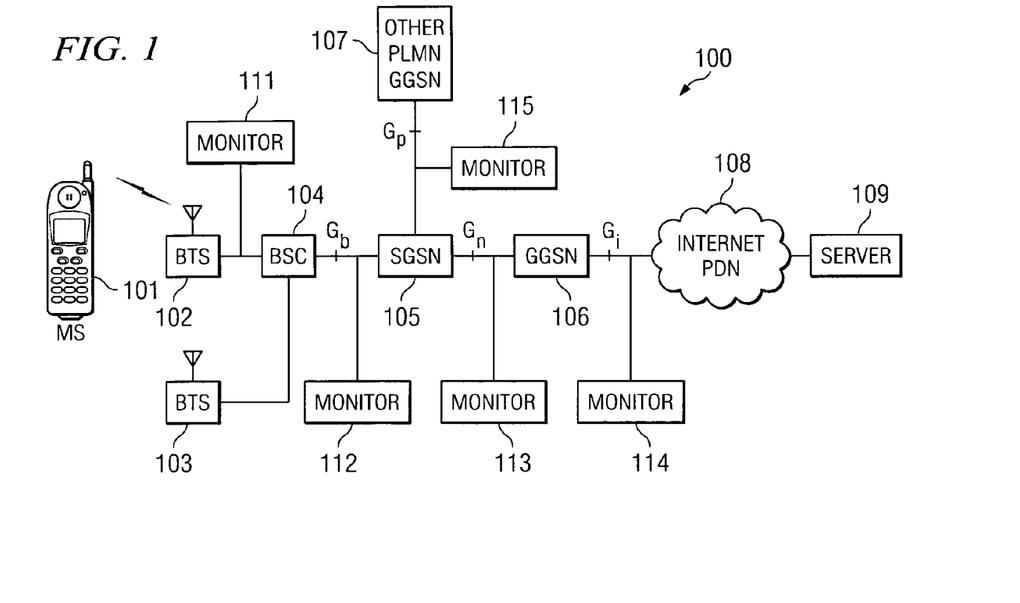
FIG. 1 is a block diagram of General Packet Radio Service (GPRS) system 100.

FIG. 1 is a block diagram of General Packet Radio Service (GPRS) system 100 that is used to deliver data packets to and from mobile stations and wireless devices. In FIG. 1, Mobile Station (MS) 101 is in wireless communication with Base Transceiver Station (BTS) 102. BTS 102 and 103 are controlled by Base Station Controller (BSC) 104. BTS 102, 103 and BSC 104 together form a Base Station Subsystem (BSS).

BSC 104 is coupled to Serving GPRS Support Node (SGSN) 105 via interface Gb. SGSN 105 is responsible for packet routing and transfer, mobility management, logical link management, and authentication and charging functions. SGSN 105 is coupled to Gateway GPRS Support Node (GGSN) 106 and 107, which act as interfaces between the GPRS network and external Packet Data Networks (PDN). GGSN 106 and 107 convert the GPRS packets from SGSN into the appropriate packet data protocol format and sends them to the corresponding packet data network. In the other direction, GGSN 106 and 107 convert packet data protocol addresses of incoming data packets to the address of the destination user, which may be a Global System for Mobile (GSM) address.

GGSN 107 is part of a different Public Land Mobile Network (PLMN) and is coupled to SGSN 105 via interface Gp.

GGSN 106 is part of the same PLMN as SGSN 105 and they are coupled via interface Gn. The Gi interface connects GGSN 106 to external PDN 108, which may be a public or private network, such as the Internet or corporate intranet. PDN 108 is coupled to many servers, computers, gateways and other devices, such as server 109, for example. Server 109 may provide a service that is desired by the user at MS 101. GPRS system 100 provides an end-to-end packet switched data transfer between MS 101 and server 109.

In one embodiment of the present invention, a number of monitoring units 111-115 are coupled to interfaces in system 100. Monitors 111-115 passively monitors all IP data from MS 101 and the associated responses or acknowledgements from server 109. As messages are exchanged between MS 101 and server 109, monitors 111-115 can be used to determine the delay caused by the GPRS network and server 109 at different points in system 100. This allows the service provider and/or users to identify the specific delay associated with each of the components in system 100.

Figure 2:
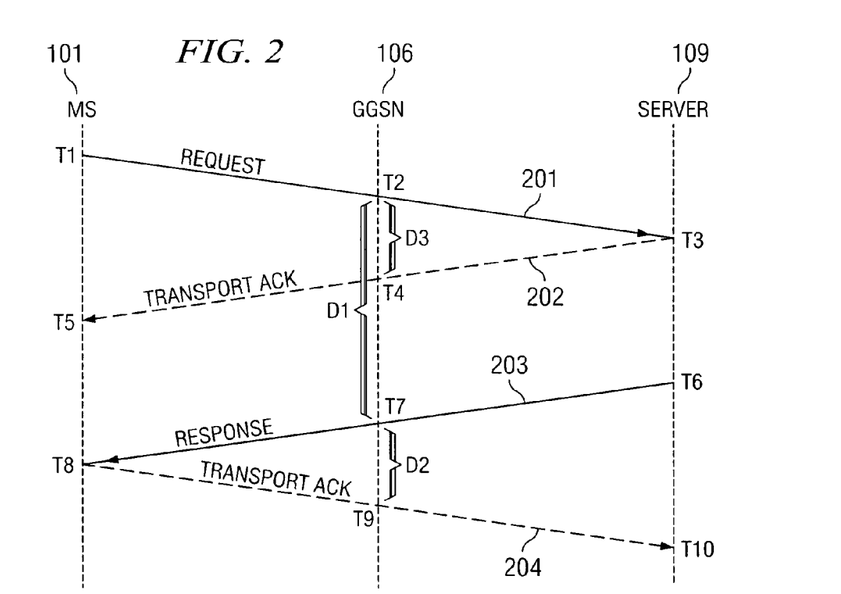
FIG. 2 illustrates messages exchanged between MS 101 and server 109 across GPRS network 100.

FIG. 2 illustrates messages exchanged between MS 101 and server 109 across GPRS network 100 shown in FIG. 1. MS 101 sends request 201, such as a file request, to server 109. Request 201 is sent at time T1, passes GGSN 106 at time T2, and arrives at server 109 at time T3. Upon receiving request 201, server 109 responds with transport acknowledge message 202 to acknowledge the receipt of request 201. Transport acknowledge message 202 does not necessarily include the file that is requested in message 201, but is sent only to inform device 101 that request 201 has been received. Transport acknowledge message 202 is sent essentially immediately at time T3, passes GGSN 106 at time T4 and arrives at device 101 at time T5. The delay, if any, at time T3 is minor and would be due to protocol delays having very little latency.

Server 109 obtains the requested information or file and sends it to device 101 in response 203. There is a delay while server 109 obtains the requested information. Response 203 is sent by server 109 at time T6, passes GGSN 106 at time T7, and arrives at device 101 at time T8. Device 101 acknowledges the receipt of response 203 in transport acknowledge message 204, which is sent at time T8, passes GGSN 106 at time T9 and arrives at server 109 at time T10.

The user at device 101 requests information from server 109 at time T1, but does not receive the requested information until time T8. The delay from T1 to T8 is the user-perceived network delay. The user-perceived delay is due to many factors including; (1) the delay from T1 to T3, which is the transmission time for request 201, (2) the delay from T3 to T6, which is the processing time for server 109, and (3) the delay from T6 to T8, which is the transmission time of response 203.

The actual service delay is the time between T3 and T6, from when the server receives a request until the server responds to the request. However, the user-perceived delay is from T1 to T8, which may be much longer than the time from T3 to T6. Often the user will blame the wireless network service provider for the entire user-perceived delay. However, much of the delay occurs outside the wireless network and the service provider has little, if any, control over this delay. For example, the delay from T2 to T3 and from T6 to T7 is caused by transmission delays between GGSN 106 and server 109 across PDN/Internet 108 (FIG. 1). Also, the delay from T3 to T6 is due to the processing at server 109, such as receiving and processing request 201, obtain the requested information, and generate response 203. The wireless service provider would like to monitor the user-perceived delay, but cannot directly monitor the end-to-end delay. By observing the request, response and acknowledgement messages at an observation point, such as at GGSN 106, for example, the service provider may estimate the user-perceived delay.

At a network observation point, such as at GGSN 106, the total round-trip delay can be determined by adding the wireless network delay (i.e. the network downlink delay) and the server-side delay (i.e. the network uplink delay). In one embodiment, request 201 is assumed to have the same transmission time as transport acknowledge message 204, and that response 203 has the same transmission time as request transport message 202. The network downlink delay ("D2") can be measured at GGSN 106 as the total time from T7 to T9. The uplink network delay ("D3") can be measured at GGSN 106 as the total time from T2 to T4. The uplink round trip user-perspective delay ("D1") is the total time from T2 to T7. This corresponds to the time of the initial response (203) minus the time of the initial query (201) as observed at GGSN 106.

The end-to-end network delay (ND) and the end-to-end user-perspective delay (UPD) can be calculated as follows:

$$ND = \frac{D2 + D3}{2} \qquad \text{(Equation 1)}$$

$$UPD = D1 + D2 \qquad \text{(Equation 2)}$$

To calculate delay D1, GGSN 106 timestamps and correlates messages at the application layer into transactions based on user perception. For example, an HTTP transaction latency could be the delay between a "GET" message and a "STATUS" message. The D1 delay is the difference between the time of the initial response and the time of the initial query at the network observation point. This corresponds to the time T7-T2, which includes the network uplink delay.

The TCP sequence number acknowledgement mechanism can be used to calculate delay D2. The transport delay can be calculated by time stamping TCP packets (not application messages) and correlating TCP receiver ACK sequence numbers with sender sequence numbers. The D2 delay is the difference between the time of ACK for sequence X and the time of sequence X. This corresponds to the time T9-T7.

By adding D1 and D2, the estimated UPD is obtained for time latency T2 to T9. Since the true UPD is T1 to T8, the value of D1+D2 is an estimate with error value "Err." The error can be represented as follows:

$$\text{Err} = (T2-T1) - (T9-T8) \qquad \text{(Equation 3)}$$

Err is randomly distributed independent of application queries. Therefore, for accumulated estimated UPD across different queries:

$$|\Sigma \text{Err}| \cong 0 \qquad \text{(Equation 4)}$$

To smooth the estimated UPD, an adaptive (recursive) weighting function such as the one used by TCP round trip delay time estimated algorithm. To emphasize the most recent user experience (i.e. the last query), the weighting factor on the current sample may be higher than TCP recommendations. For example, the weighting factor for the current sample may be set at 0.9, instead of the recommended 0.5. The smoothed estimated D2' delay may be expressed as:

$$D2' = D2' \times (1-\alpha) + D2 \times \alpha \qquad \text{(Equation 5)}$$

where $\alpha$ is the weighting factor, such as 0.9, for example. The smoothed total UPD is $$UPD = D2' + D1 \qquad \text{(Equation 6)}$$

While D2 represents the downlink network delay (i.e. from GGSN 106 to device 101 to GGSN 106) at monitor reference point, the uplink network delay D3 (i.e. from GGSN 106 to server 109 to GGSN 106) may be calculated using the smoothing algorithm recited above. The delay D3 is the difference in time from T2 to T4.

The end-to-end network delay time "ND" is shown in Equation 1, and the server processing delay "D" is $$D = D1 - D3 \quad \text{(Equation 7)}.$$

An alternative embodiment offers the use of multiple monitoring reference points through the traffic paths. The network delay delta between reference points therefore results in network delay per path segment. This information may be used for troubleshooting. The server processing delay also provides important measurements for server performance.

By extracting important information from user data, such as network elements (Server Address, GGSN, SGSN, BSC, RAI, CELL) and handset profiles, aggregating ND or UPD by proper combination of elements in real time provides information about the network, server, and handset performance.

Although the exemplary embodiments described and illustrated herein focus on TCP connections, it will be understood that the present invention shall apply to any non-TCP transport protocols that support connection-oriented procedures. For example, the present invention may be used with Wireless Transport Protocol (WTP) by tracking its class 2 transactions.

The above-described monitoring may be accomplished at GGSN 106 (FIG. 1). GGSN 106 may have application software that tracks and correlates messages that it passes, or separate monitoring devices, such as monitors 113 and 114, may be used to track messages that pass GGSN 106. It will be understood that in other embodiments, GGSN 106 does not have to be used to monitor the message. Instead, the monitoring may be accomplished at other points in the network. For example, messages may be monitored at any server, router, or other component in the signal path of the messages or acknowledgements.

The present invention allows the service provider to monitor a large number of client devices or mobile handsets because it does not require the monitoring equipment to be located at each individual mobile device. The client devices may include, for example, personal digital assistants, mobile telephone, or laptop computer enabled with any fixed or wireless data-service-enabled client. The present invention does low level correlation between application requests, responses, and transport acknowledgement messages that are associated with particular devices and calculates the user-perceived delay for each transaction. The user-perceived delay and network delay can be determined on a per wireless device or per session basis, thereby allowing the service provider to determine the level of service that is being provided to customers.

Using the present invention, the service provider may also identify which devices, services, network elements, or geographic areas (or cells) cause the most or least delay. For example, by analyzing delay per handset and correlating handset types, a service provider may identify which model handset or which browser has the longest delay. Alternatively, by analyzing and correlating delay data on a per website or per service basis, the service provider may identify which third-party application or server is causing the most or least delay. This would allow the service provider to evaluate the availability or responsiveness of servers or applications that are accessed by users.

For Level 2 or EP interactive applications, such as HTTP, WTP, MMS, POP, SMTP, FTP, a session usually consists of multiple transactions. Each transaction usually transfers data in one direction. Between transactions there may be pauses for any length of time. Due to the interactive nature of these applications, the average bit rate does not always provide meaningful performance measurements because the pauses between transactions cause the average bit rate to drop. For accurate bit rate measurements, it is necessary to measure bit rates only during the transfer times while excluding pause times. These bit rates are the Burst Bit Rate (BBR).

There are two basic measurements of data transfer in Level 2 applications: out-of-band data transfer and in-band data transfer. Out-of-band data transfer occurs through a data path that is different than the control path. File Transfer Protocol (FTP) is an example of an out-of-band data transfer Level 2 application. In-band data transfer occurs through the same data path as the control channel. There are two types of in-band data transfer, imbedded or non-imbedded. Imbedded data transfer imbeds data in the query or response message of the transaction. There are no separate transactions for purely data transfer purposes. HTTP, WTP and POP3 are examples of imbedded data transfer protocols. Non-imbedded data transfer protocols have transactions defined purely for data transfer purpose. Usually the control transaction precedes the data transfer transaction. SMTP is an example of a non-imbedded data transfer application protocol.

In typical wireless networks with a wide range of transmission technologies, bursts of data are usually buffered at network nodes where transmission bottlenecks occur, such as at the BSC. This presents a problem for monitoring systems that are deployed upstream of the bottleneck. Without considering the delay caused by buffering at network bottlenecks, the monitoring system will produce inaccurate burst bit rate measurements. By calculating the end-to-end transfer time, a monitoring system can produce reliable and consistent measurements regardless of where the monitoring reference point is located.

The Burst Bit Rate is defined as:

$$BBR = \frac{V}{T2 - T1}, \quad \text{(Equation 8)}$$

where V is the total number of bytes transferred from end point A to end point B; T1 is the starting time of the transfer at A; and T2 is the arrival time of the last byte at B.

Based upon the equation above, the Network Burst Bit Rate (nBBR) as measured at the transport layer is defined as:

$$nBBR = \frac{N}{E - S + ND}; \quad \text{(Equation 9)}$$

and the User Burst Bit Rate (uBBR) as measured by the application layer is defined as:

$$uBBR = \frac{U}{E - S + ND}, \quad \text{(Equation 10)}$$

where, for each data transfer:

S is the monitored time of the first packet transferred from sender;

E is the monitored time of the last packet transferred from the sender;

N is the total number of bytes transferred from sender at transport layer;

U is the total number of bytes transferred from sender at application layer; and ND is the estimated network delay from Equation 1.

For each transaction captured at a monitor reference point, parameters S, E, N and U are obtained and delay ND is computed as discussed above.

FIGS. 3-12 illustrate data transfer transactions for various protocols. In the examples illustrated in FIGS. 3-12, T2−T1 is the actual data transfer time. The estimated data transfer time is:

$$E-S+ND \approx T2-T1 \qquad \text{(Equation 11)}.$$

It is assumed that ND is derived from the underlying transport layer monitoring.

Figure 3:
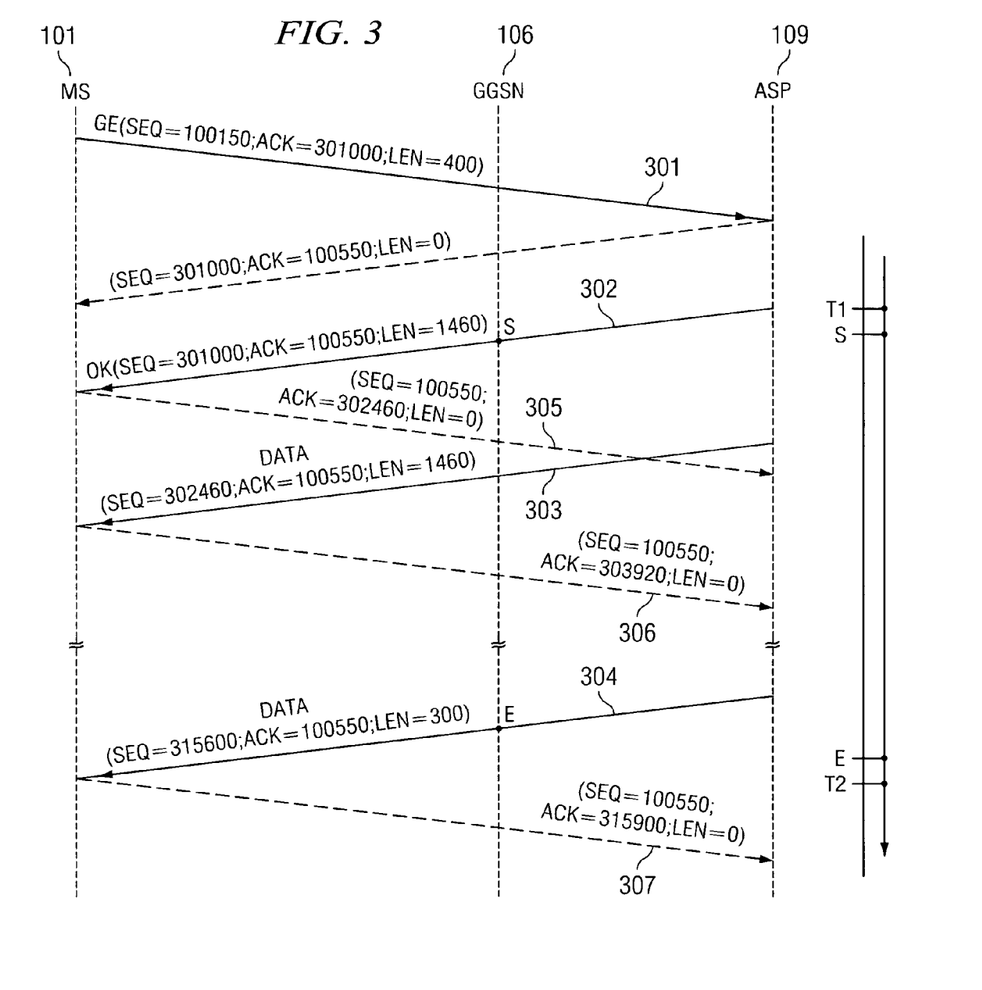
FIG. 3 illustrates the "Get" transaction, which is an example of data transfer from MS 101 to server 109.
Figure 4:
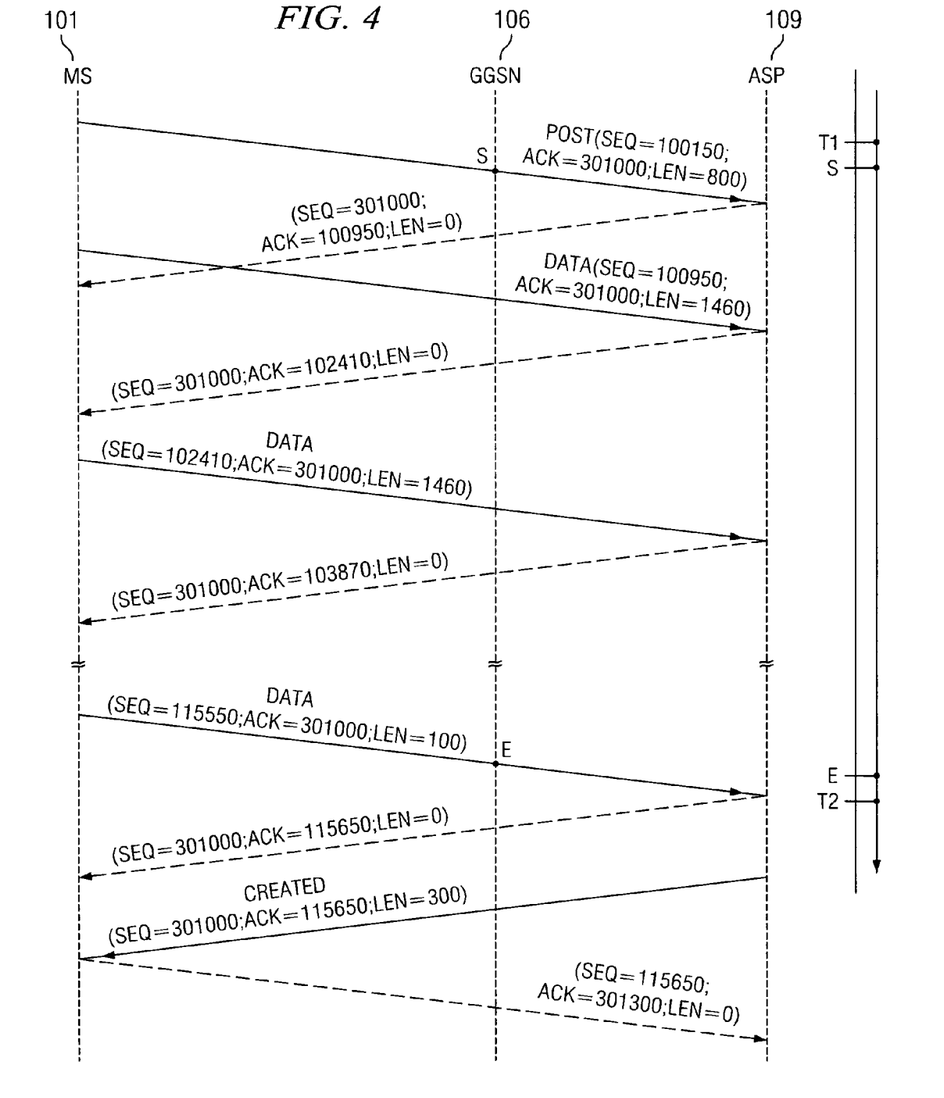
FIG. 4 illustrates an HTTP "Post" data transfer.

FIGS. 3 and 4 illustrate HTTP data transfer transactions, which can occur in either direction. HTTP data transfer is in-band and is embedded in the query or the response messages. FIG. 3 illustrates the "Get" transaction, which is an example of data transfer from server 109 to MS 101. A "Get" data transfer is an example in which data transfer is embedded in the response message. The number of user bytes can be determined from the sequence numbers in the "Data" messages from server 109. For example, in response to "Get" message 301, server 109 sends "OK" response message 302 with sequence number 301000. Response message 302 is followed by a series of "Data" messages, such as messages 303 and 304, from server 109. There may be any number of "Data" messages as required to transfer the requested information. Each "Data" message has a sequence number and a length number, such as "Seq=302460" and "len=1460" in message 303. The transport acknowledgement messages 305-307, which may be TCP acknowledge messages, indicate the last byte transferred in the corresponding "Data" message. For example, the parameter "Ack=315900" in message 307 indicates that the last byte transferred in the illustrated data transfer was byte 315900. The total number of user bytes transferred in the example of FIG. 3 is 315900−301000=14,900 bytes ("Ack" number in last "Data" message 304 minus "Ack" number in "Get" message 301).

T1 is the time when server 109 begins sending data. This initial data is detected by GGSN 106 at time S. T2 is the time when MS 101 receives the last data message. This last message is detected at GGSN 106 at time E. It is apparent from the illustration that the actual data transfer time T2-T1 is slightly greater than the data transfer time (E−S) that is detected at GGSN 106. Server 109 is external to the GPRS network and is not monitored directly. However, using the parameters detected by the GPRS network monitoring system, the actual data transfer time in FIG. 3 can be estimated using Equation 11 above.

In an HTTP data transfer, the last message in a sequence is not specifically identified. As a result, the monitoring unit must keep a running total of the bytes transferred and update that total with every new message. The monitoring unit must also track the time of each message, such as time "E'" for intermediate "Data" message 303, in case that is the last message. The monitoring unit may identify the most recently received message as the last message in a particular transaction, for example, if a new transaction begins or if a predetermined period of time passes after receiving one of the "Data" messages. Other methods may also be used to determine the "last" message without limitation to the invention. The time "E'" for the last message is then used as time "E" for the burst bit rate calculation. The "last" message for transactions using other protocols that do not specifically identify the final message may be identified in a similar manner.

FIG. 4 illustrates an HTTP "Post" data transfer. In a "Post" data transfer, the data transfer is embedded in the query message. The message flow shown in FIG. 4 illustrates the time reference points S and E for the first and last data packets as detected at GGSN 106. The total number of user bytes can again be derived from the sequence numbers and/or the acknowledgement numbers. In the "Post" data transfer of FIG. 4, the number of user bytes transferred is: 115650−100150=15500 ("SEQ" number in last message minus "SEQ" number in "POST" message.

Figure 5:
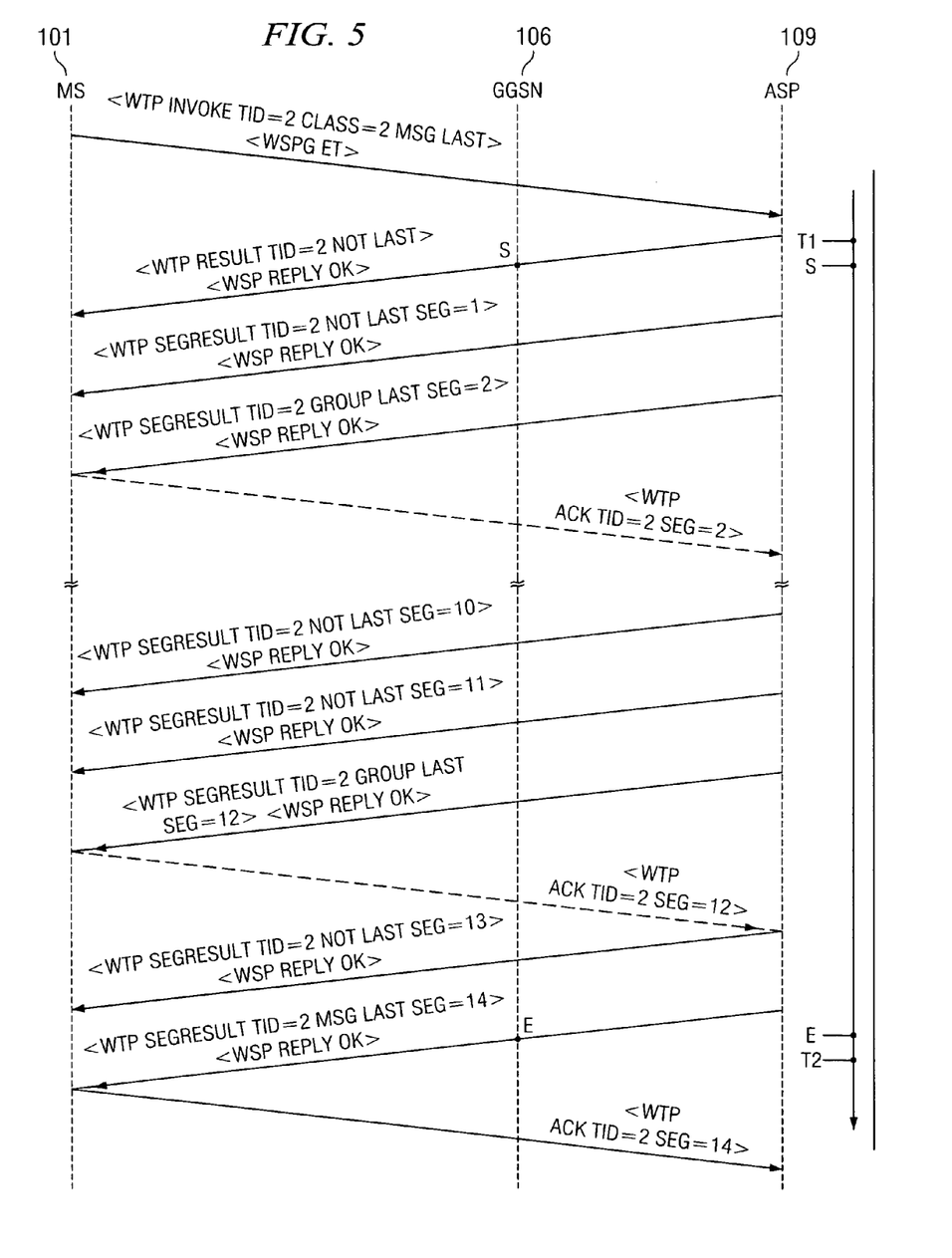
FIG. 5 illustrates the message flow for a WSP "Get" data transfer.
Figure 6:
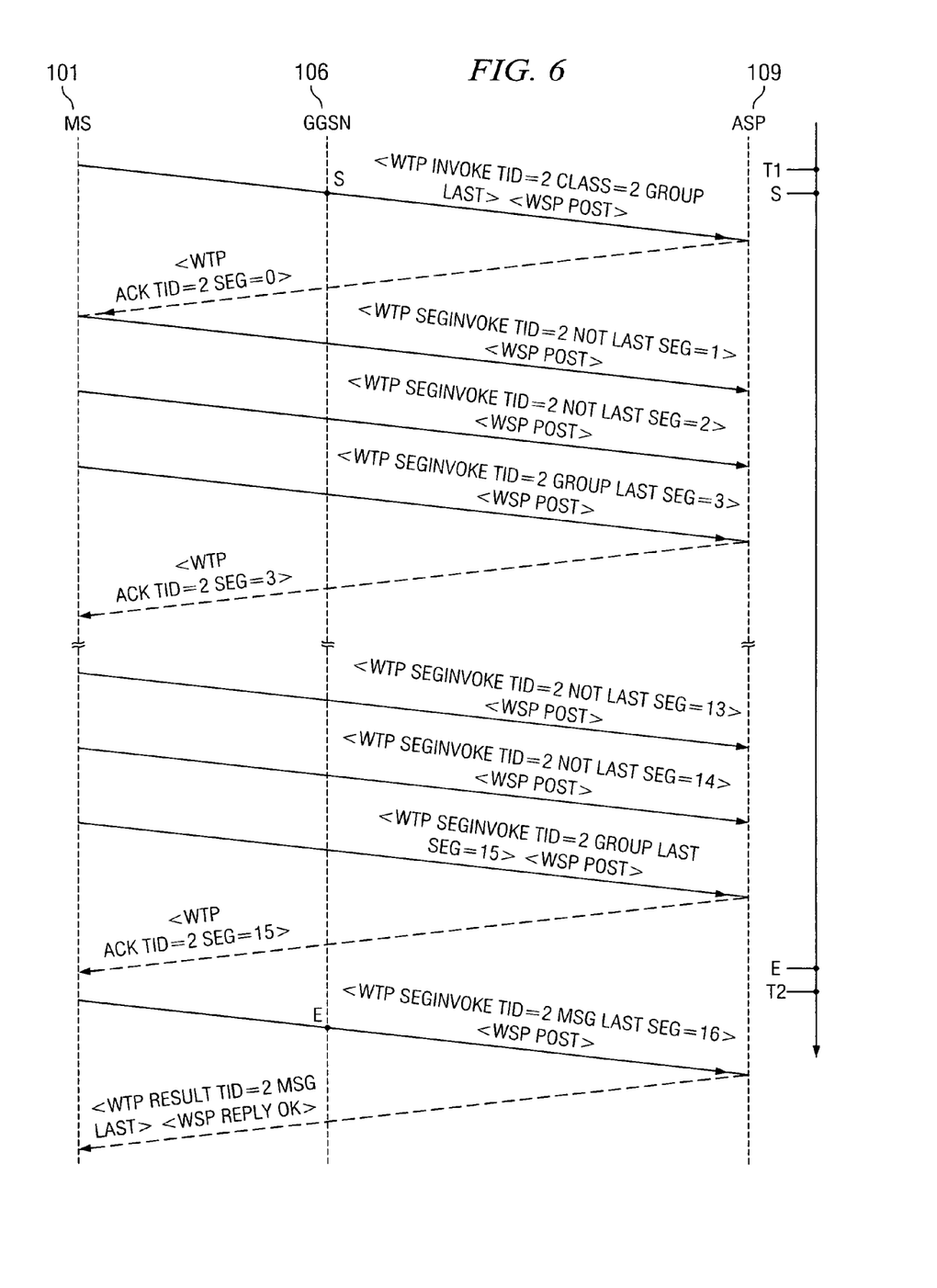
FIG. 6 illustrates the message flow for a WSP "Post" data transfer.

FIG. 5 illustrates the message flow for a WSP "Get" data transfer. WSP uses WTP as the underlying transport layer instead of TCP. The data transfer in WSP is embedded in the query or response messages like HTTP. The example message flow shown in FIG. 5 indicates where the burst bit rate time references, S and E, are detected in a WSP "Get" data transfer. FIG. 6 illustrates the message flow for a WSP "Post" data transfer and indicates where the burst bit rate time references are detected for such transfers. In a WSP data transfer, the last message 501 (FIG. 5) or 601 (FIG. 6) is always identified, so the monitoring unit can identify time E by detecting the message labeled as "last."

Figure 7:
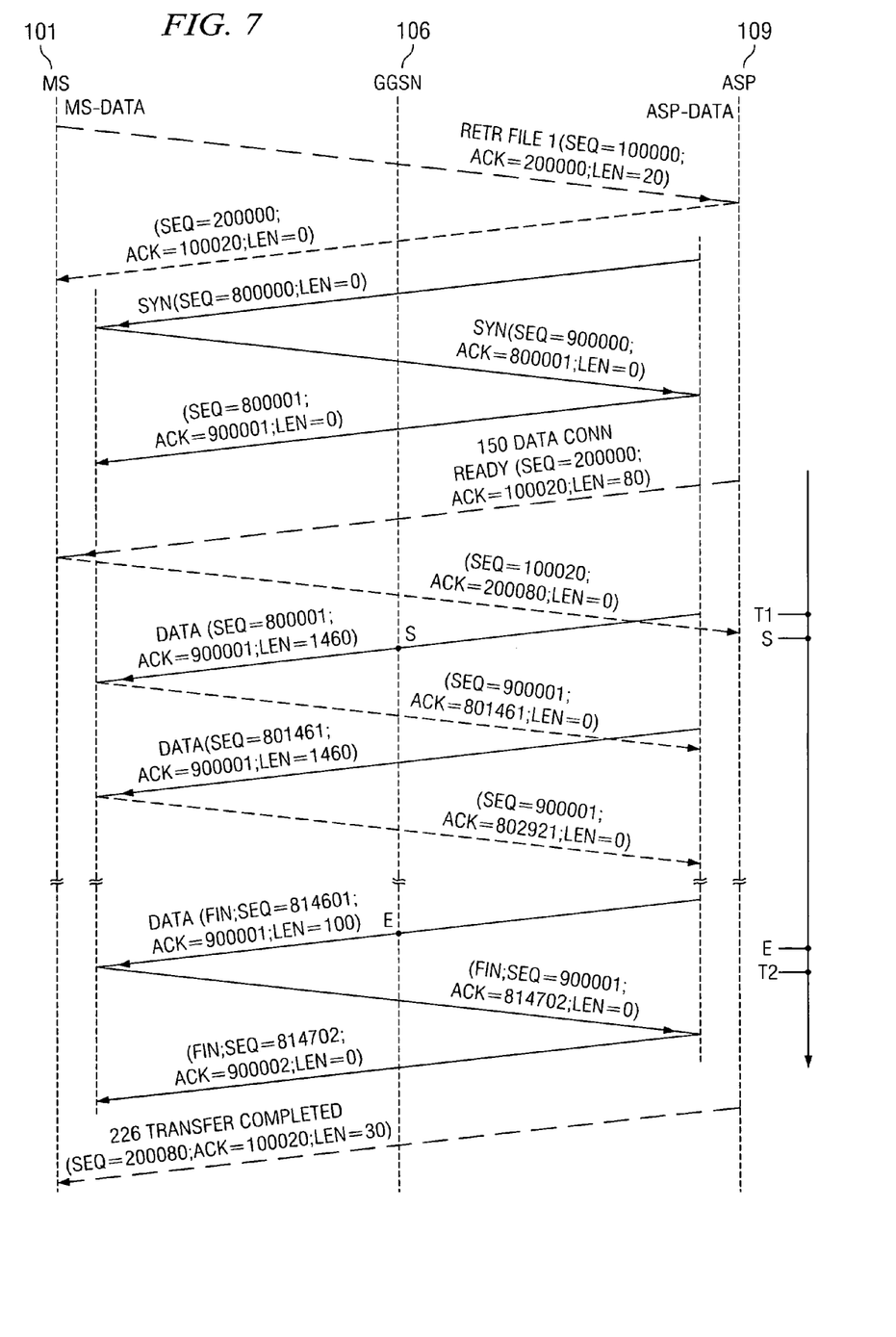
FIG. 7 illustrates a "Retrieve" data transfer from server 109 to MS 101.
Figure 8:
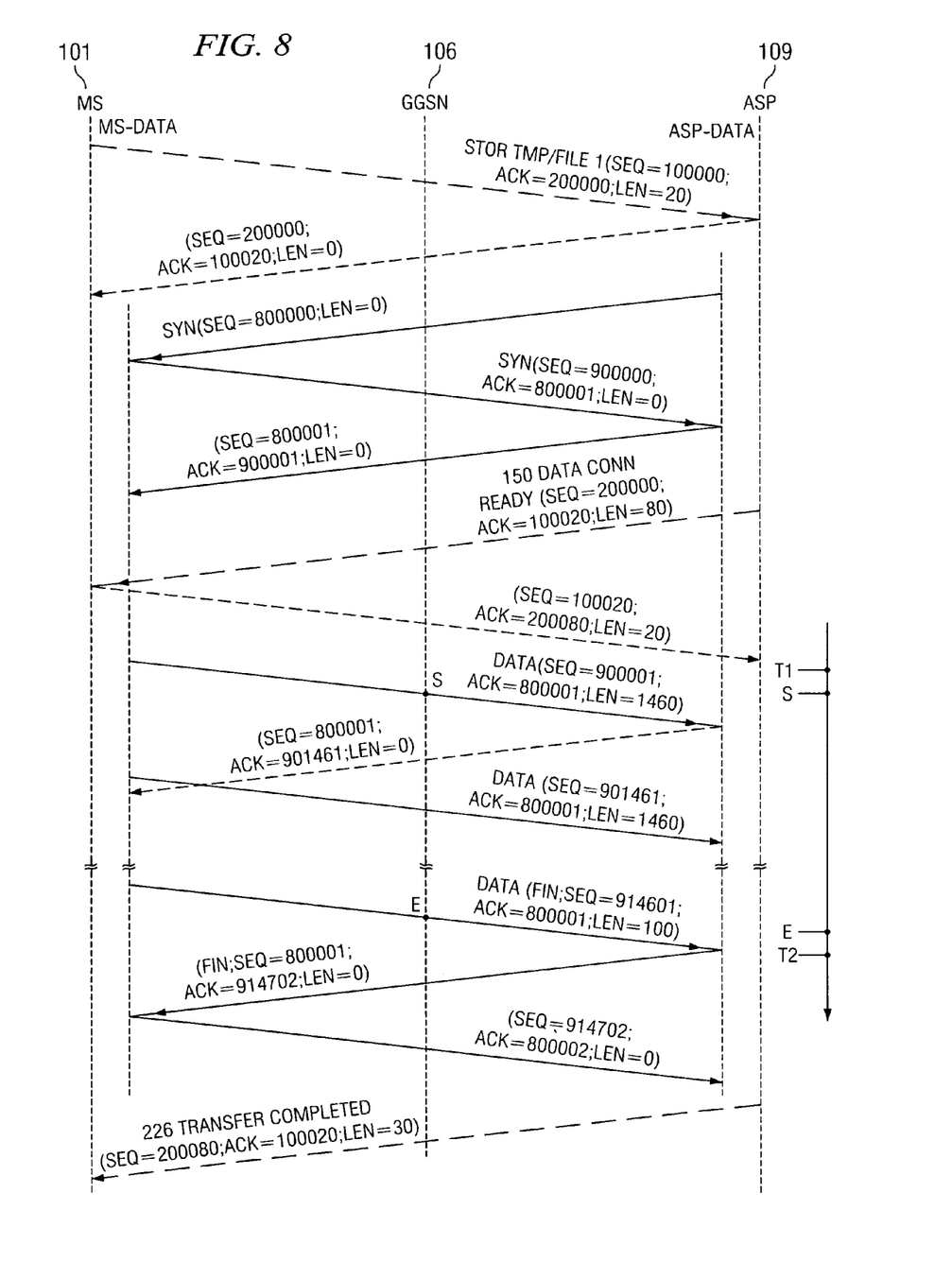
FIG. 8 illustrates a "Store" data transfer from MS 101 to server 109.

FIGS. 7 and 8 illustrate the message flow and burst bit rate time references for FTP data transfers. FTP establishes a separate connection for data transfer. A new TCP connection is set up for data transfer in addition to the control connection. FIGS. 7 and 8 also illustrate the 3-way TCP connection setup and teardown message flow in the data transfer connections. Data transfer can be in either direction. The monitoring system must recognize that these separate TCP connections are related and must correlate the FTP control connection and the associated data transfer connection. FIG. 7 illustrates a "Retrieve" data transfer from server 109 to MS 101. FIG. 8 illustrates a "Store" data transfer from MS 101 to server 109.

Figure 9:
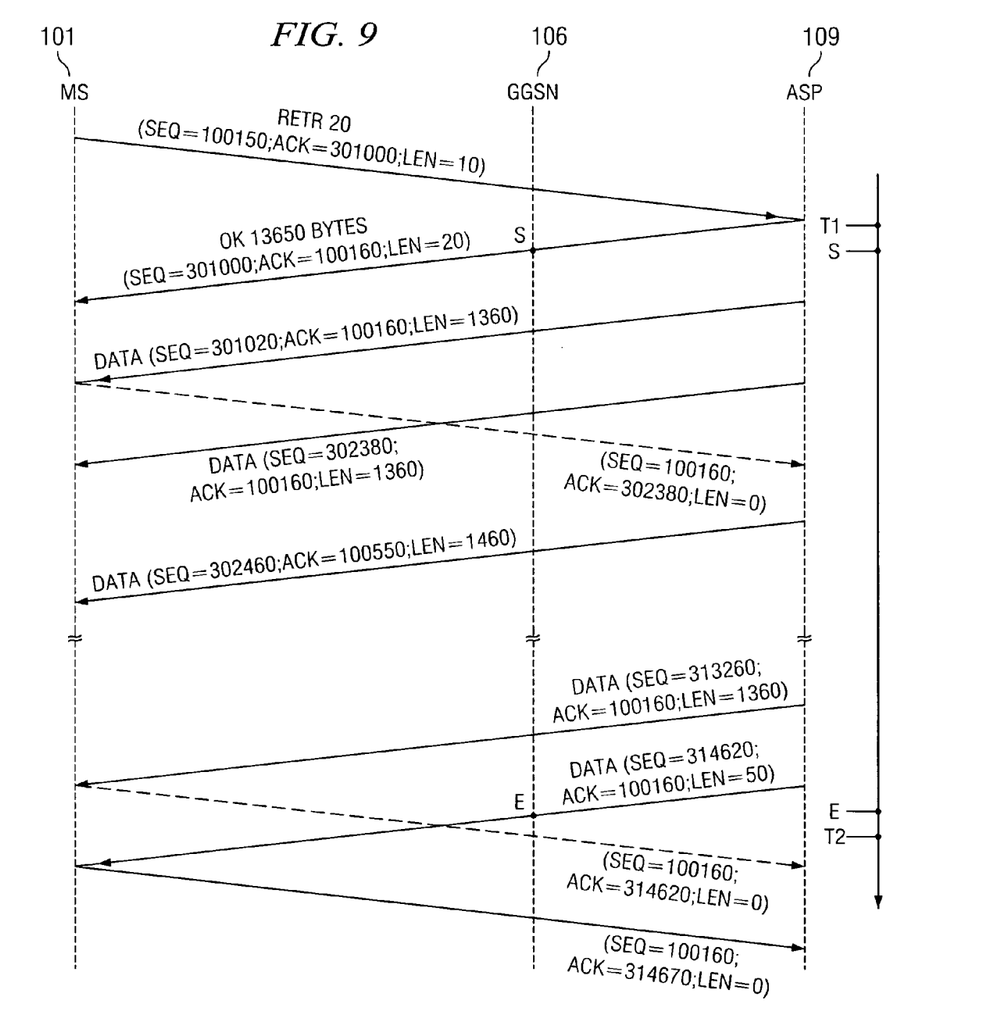
FIG. 9 illustrates the message flow and burst bit rate time references for the POP3 email post office protocol.

FIG. 9 illustrates the message flow and burst bit rate time references for the POP3 email post office protocol. POP3 data transfer is in-band and is usually in one direction from server 109 to MS 101. POP3 data transfer is embedded in the response message.

Figure 10:
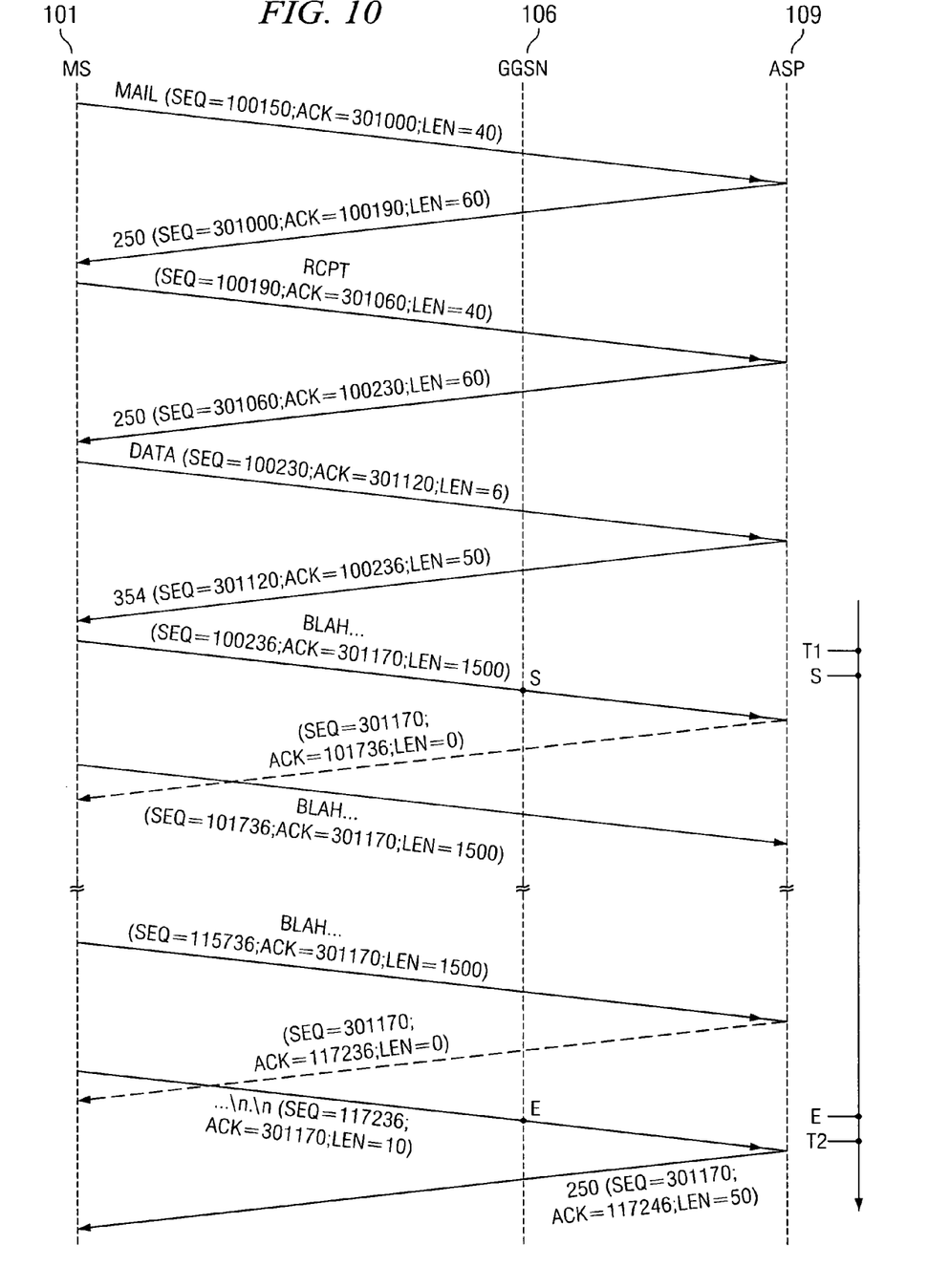
FIG. 10 illustrates the message flow and burst bit rate time references for SMTP data transfers.

FIG. 10 illustrates the message flow and burst bit rate time references for SMTP data transfers. SMTP is used to send mail to a destination server. Therefore, data transfer is typically in one direction from MS 101 to server 109. SMTP data transfer is in-band, but is not embedded in the query message. Actual data transfer does not start until after the response to the "Data" request is received. The "Mail" and "Rcpt" transactions occur before the data transfer in SMTP.

Figure 11:
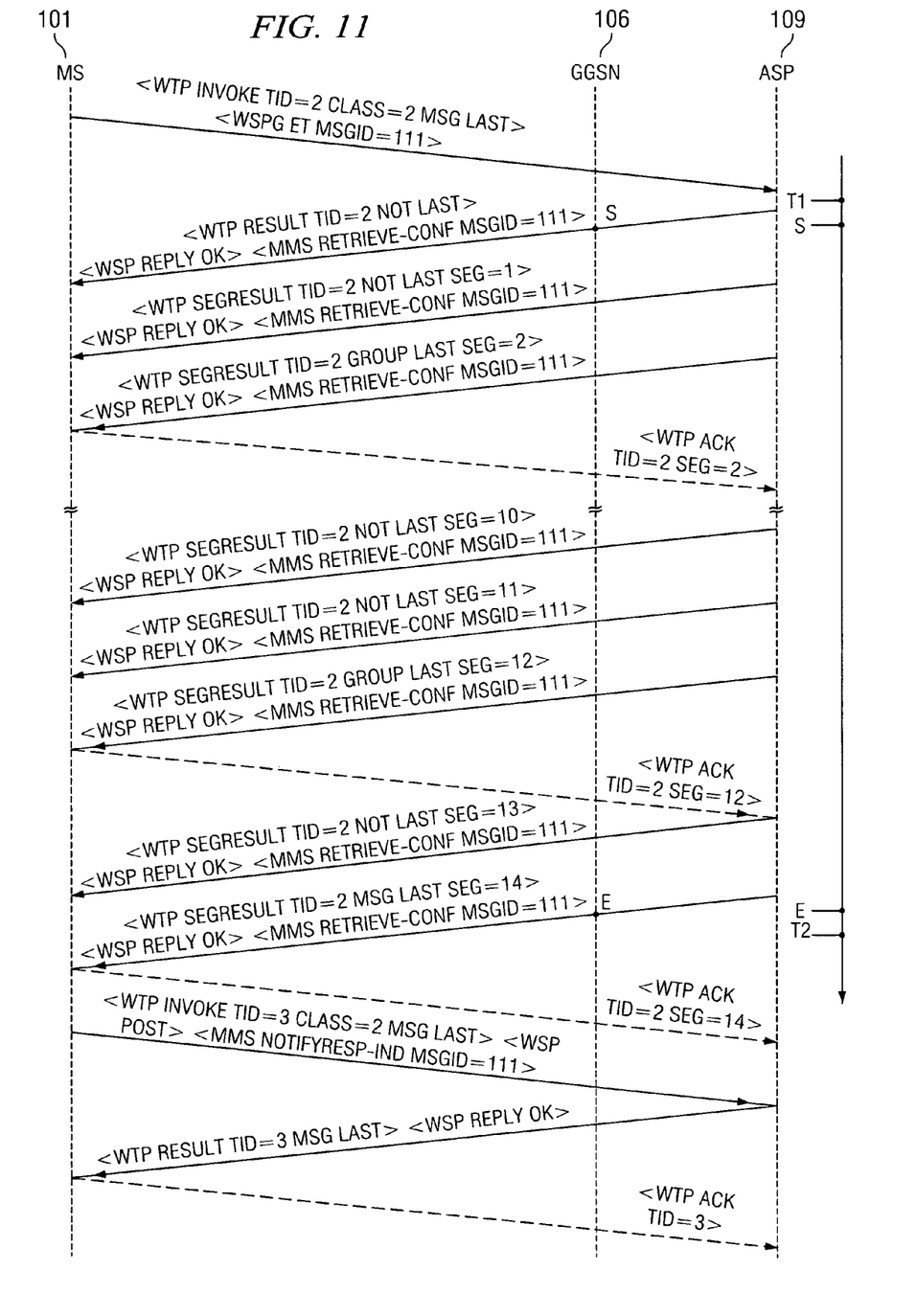
FIG. 11 illustrates the MMS "mms-retrieve" data transfer transaction.
Figure 12:
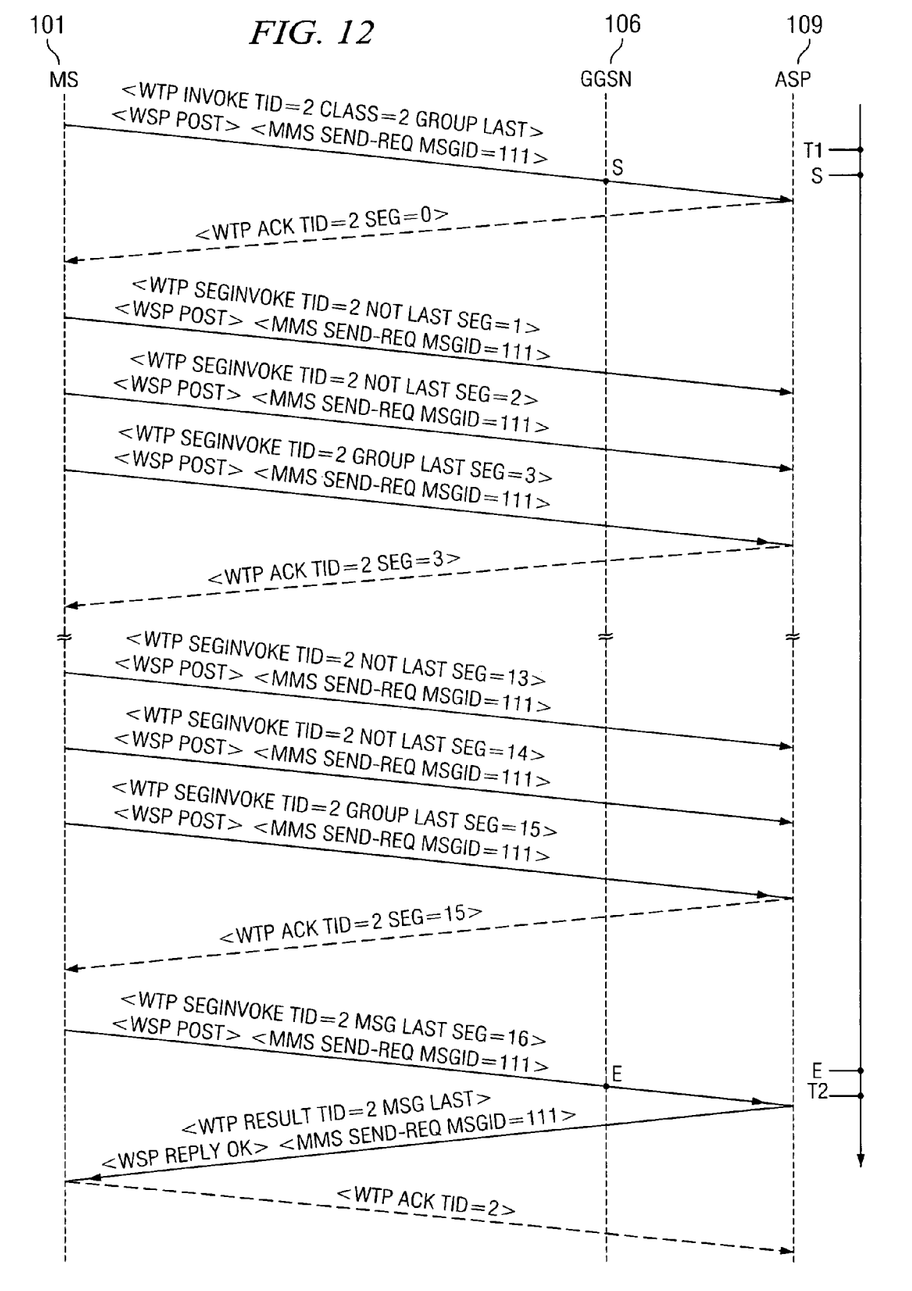
FIG. 12 illustrates the MMS "mms-send" transaction.

FIGS. 11 and 12 illustrate the message flow and burst rate bit time references for MMS data transfer. MMS is encapsulated by WSP and there is a close mapping between WSP transactions and MMS transactions. FIG. 11 illustrates the MMS "mms-retrieve" data transfer transaction; and FIG. 12 illustrates the MMS "mms-send" transaction. The burst bit rate calculations for these examples are identical to the examples given for WSP in FIGS. 5 and 6.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for calculating a burst bit rate in a network comprising:
   determining a total delay time by:
      determining a time for a number of bytes to pass a point in the network, wherein the number of bytes is the total number of bytes sent from a sender to a receiver in response to a request; and
      adding an estimated network delay time; and
      dividing the number of bytes by said total delay to calculate said burst bit rate;
   wherein the determining the total delay time and dividing the number of bytes by said total delay to calculate said burst bit rate are performed by a device disposed between the sender and the receiver in the network.

2. The method of claim 1, wherein the estimated network delay time is determined by estimating a round trip sender delay time between a sender and the point in the network, estimating a round trip receiver delay time between a receiver and the point in the network, and adding the sender delay time and receiver delay time and then dividing by two.

3. The method of claim 1, wherein the point in the network is at a General Packet Radio Service Gateway Support Node (GGSN).

4. The method of claim 1, wherein the burst bit rate is for an out-of-band transfer.

5. The method of claim 1, wherein the burst bit rate is for an in-band transfer.

6. The method of claim 5, wherein the in-band transfer is imbedded.

7. The method of claim 5, wherein the in-band transfer is non-imbedded.

8. The method of claim 1, wherein the burst bit rate is a user burst bit rate.

9. The method of claim 1, wherein the burst bit rate is a network burst bit rate.

10. The method of claim 1, wherein the time for a number of bytes to pass the point in the network is determined by identifying a start time for a first packet from the sender and identifying an end time for a last packet from the sender.

11. The method of claim 1 wherein said calculating a burst bit rate comprises:
   calculating said burst bit rate for live network transactions between a service provider customer and a server.

12. The method of claim 1, wherein the determining the total delay time and dividing the number of bytes by said total delay to calculate said burst bit rate are performed by a General Packet Radio Service Gateway Support Node (GGSN).

13. A method for determining a burst bit rate in the network comprising:
   monitoring at a point in the network a number of bytes transferred from a sender to a receiver, wherein said point in the network is between the sender and the receiver;
   determining a transmission time between a first packet transferred by the sender and a last packet transferred by the sender; and
   estimating the burst bit rate by dividing said number of bytes by the transmission time plus an estimated network delay, wherein the estimated network delay time is determined by estimating a round trip sender delay time between the sender and the point in the network, estimating a round trip receiver delay time between the receiver and the point in the network, and adding the sender delay time and receiver delay time and then dividing by two;
   wherein said monitoring, determining a transmission time, and estimating the burst bit rate are performed by at least one device that is communicatively coupled to said network.

14. The method of claim 13, wherein the point in the network is in a transport layer of the network.

15. The method of claim 14, wherein the point in the network is a General Packet Radio Service Gateway Support Node (GGSN).

16. The method of claim 13, wherein estimated burst bit rate is for an out-of-band transfer.

17. The method of claim 13, wherein the estimated burst bit rate is for an in-band transfer.

18. The method of claim 13, wherein the transmission time is determined by identifying a start time for a first packet from the sender and identifying an end time for a last packet from the sender.

19. The method of claim 13, wherein the point in the network is a passive monitor apart from other network equipment.

20. The method of claim 13 wherein said sender comprises a service provider customer, and wherein said burst bit rate comprises burst bit rate for live network transactions between said service provider customer and a server.

21. A system for determining a burst bit rate in a transport layer in a network comprising:
   a computing platform connected to the network and operable, based on observations of communication between a sender and a receiver at a monitoring point of the network between the sender and receiver, to:
      determine a number of bytes transferred from the sender to the receiver;
      determine a time between a first packet sent by the sender and a last packet sent by the sender;
      estimate a network delay, wherein the network delay time is determined by estimating a round trip sender delay time between the sender and the point in the network, estimating a round trip receiver delay time between the receiver and the point in the network, and adding the sender delay time and receiver delay time and then dividing by two; and
   divide the number of bytes by the time plus the estimated network delay to calculate the burst bit rate.

22. The system of claim 21, wherein the computing platform is part of a General Packet Radio Service Gateway Support Node (GGSN).

23. The system of claim 21, wherein the time number of bytes to pass the point in the network is determined by identifying a start time for a first packet from the sender and identifying an end time for a last packet from the sender.

24. The system of claim 21, wherein the system is located at a monitor connected to the network.

25. The system of claim 21 wherein said sender comprises a service provider customer, and wherein said burst bit rate comprises burst bit rate for live network transactions between said service provider customer and said receiver.

26. The system of claim 21 wherein said sender comprises a service provider customer, and wherein said number of bytes transferred from said sender to said receiver are transferred during live network transactions between said sender and said receiver.

27. The system of claim 21 wherein said sender comprises a service provider customer, and wherein said first packet sent by the sender and said last packet sent by the sender are sent during live network transactions between said sender and said receiver.

28. A method for calculating a burst bit rate in a transport layer of a network comprising:
    monitoring a first time for a first packet transferred from a sender;
    monitoring a second time for a last packet transferred from the sender;
    determining a total number of bytes transferred;
    estimating a network delay; and
    calculating the burst bit rate by dividing the total number of bytes transferred by the difference between the second time and the first time plus the estimated network delay;
    wherein said monitoring a first time, monitoring a second time, determining a total number of bytes transferred, estimating a network delay, and calculating the burst bit rate are performed by at least one device that is communicatively coupled to said network.

29. The method of claim 28 wherein said sender comprises a service provider customer, and wherein said first packet transferred from the sender, the last packet transferred from the sender, and the total number of bytes transferred are transferred during live network transactions.

30. The method of claim 28 wherein said estimating the network delay comprises:
    estimating a round trip sender delay time between the sender and a monitoring point in the network that is disposed between the sender and a destination, estimating a round trip destination delay time between the destination and the monitoring point in the network, and adding the sender delay time and destination delay time and then dividing by two.

31. A method for calculating a burst bit rate for a live network transaction between a sender and a recipient, the method comprising:
    determining a total delay time by:
        determining a time for a number of bytes included in the live network transaction to pass a monitoring point in the network, wherein the monitoring point is located between the sender and the recipient and wherein the monitoring point comprises a monitoring device;
        determining an estimated network delay time by estimating a round trip sender delay time between the sender and the monitoring point in the network, estimating a round trip receiver delay time between the receiver and the monitoring point in the network, and adding the sender delay time and receiver delay time and then dividing by two; and
        adding the estimated network delay time to the determined time for the number of bytes to pass the monitoring point; and
    dividing the number of bytes included in the live network transaction by said total delay to calculate said burst bit rate for the live network transaction between the sender and the recipient.

32. The method of claim 31 wherein the monitoring point comprises a General Packet Radio Service Gateway Support Node (GGSN).

33. The method of claim 31 wherein said determining said total delay time and dividing the number of bytes included in the live network transaction by said total delay to calculate said burst bit rate for the live network transaction between the sender and the recipient are performed by at least one device that is communicatively coupled to said network.

* * * * *